United States Patent
Hoogestraat (10) Patent No.: US 8,381,900 B1
(45) Date of Patent: Feb. 26, 2013

(54) EXTENDABLE AUGER ASSEMBLY

(75) Inventor: Alan G. Hoogestraat, George, IA (US)

(73) Assignee: Sudenga Industries, Inc., George, IA (US)

( * ) Notice: Subject to any disclaimer, the term of this patent is extended or adjusted under 35 U.S.C. 154(b) by 90 days.

(21) Appl. No.: 13/152,501

(22) Filed: Jun. 3, 2011

Related U.S. Application Data (60) Provisional application No. 61/351,034, filed on Jun. 3, 2010.

(51) Int. Cl.
*B65G 15/26* (2006.01)

(52) U.S. Cl. .......................... 198/588; 198/657; 198/594

(58) Field of Classification Search .................. 198/313, 198/657, 666, 588, 594, 595, 812
See application file for complete search history.

(56) References Cited

U.S. PATENT DOCUMENTS

| | | | |
|---|---|---|---|
| 2,845,167 A * | 7/1958 | Heiken | 198/660 |
| 3,700,179 A | 10/1972 | Van Peursem | |
| 4,356,910 A * | 11/1982 | Togstad | 198/660 |
| 4,603,775 A | 8/1986 | Plett | |
| 4,875,820 A | 10/1989 | Lepp et al. | |
| 4,963,066 A | 10/1990 | Boppart | |
| 5,098,247 A | 3/1992 | Campbell | |
| 5,099,984 A * | 3/1992 | Kuzub | 198/518 |
| 5,167,318 A | 12/1992 | Siemens | |
| 5,184,715 A | 2/1993 | Feterl | |
| 5,409,344 A | 4/1995 | Tharaldson | |
| 5,492,217 A | 2/1996 | Stewart | |
| 5,658,116 A | 8/1997 | Krull | |
| 5,746,303 A * | 5/1998 | Niewold | 198/660 |
| 5,788,055 A | 8/1998 | Stewart et al. | |
| 6,203,261 B1 | 3/2001 | South et al. | |
| 6,805,229 B2 * | 10/2004 | Dekoning | 198/313 |
| 8,083,047 B1 * | 12/2011 | Hermann et al. | 198/313 |

OTHER PUBLICATIONS

Brochure for "MK Series Augers", Westfield Industries, Published prior to Jun. 3, 2010, Westfield Industries, pp. 1-6.
Westfield MK Flex Auger Assembly & Operation Manuel, Westfield Industries, May 10, 2009, pp. 1-50.
Brochure for "MK Flex", Westfield Industries, Published prior to Jun. 3, 2010, pp. 1-2.
Brochure for "Hi Efficiency Series; Portable Augers", Sudenga Industries, Inc., Publicly available prior to Jun. 3, 2010, pp. 1-2.

* cited by examiner

*Primary Examiner* — James R Bidwell
(74) *Attorney, Agent, or Firm* — James L. Young; Westman, Champlin & Kelly, P.A.

(57) ABSTRACT

An auger assembly is disclosed that comprises an extendable auger section that includes an auger trough having first auger, an auger tube having a second auger and configured to couple to a grain-receiving hopper, and a drive mechanism configured to move the auger tube and the second auger substantially parallel to the auger trough.

20 Claims, 13 Drawing Sheets

EXTENDABLE AUGER ASSEMBLY

CROSS-REFERENCE TO RELATED APPLICATION(S)

The present application claims priority to U.S. Provisional Application No. 61/351,034, filed on Jun. 3, 2010, and entitled "EXTENDABLE HOPPER ASSEMBLY FOR PORTABLE AUGER", the disclosure of which is incorporated by reference in its entirety.

BACKGROUND

This disclosure relates to an apparatus and method for conveying material, and particularly new and useful improvements for adding versatility to a portable auger by making a portion of the auger flighting for that auger assembly extendable.

Portable grain handling equipment is known which utilizes more than one straight section of auger flighting and tubing. Such configurations are useful for unloading hopper bottom truck trailers, and in some instances provide for flexible auger hopper positioning.

Typically, a portable grain auger consists of a longer auger section defined by a long piece of auger flighting within a round tubing section mounted on an adjustable undercarriage. The configuration is such that the longer auger section sits at an incline with an opening at the top serving as an outlet and another opening at the bottom serving as an inlet. The mounting of the longer auger section to the undercarriage is constructed so that an adjustment to the undercarriage linkage allows the angle of inclination of the longer auger section be changed; thus making it possible to position the outlet at any desired height.

Another shorter section of auger flighting within a round tubing is often used in combination with this configuration is such a manner that an outlet of the shorter auger section feeds into the inlet for the longer auger section. An inlet on the shorter auger section is normally coupled to a grain collection hopper to facilitate receipt of grain as it is dumped into the hopper from a truck or trailer. While the outlet of the shorter auger section remains fixed in position relative to the inlet of the longer auger section, the inlet of the shorter auger section (and its associated grain collection hopper) can normally be swing from side to side and/or raised and lowered with respect to a grain outlet on a truck or trailer, as required.

SUMMARY

An aspect of the present disclosure is directed to an extendable auger section for use with an auger assembly. The extendable auger section includes an auger trough, an auger tube, and a drive mechanism. The auger trough has a first end configured to couple to a joint mechanism of the auger assembly, and a second end offset from the first end of the auger trough along a first axis. The auger tube has a first end and a second end offset from the first end of the auger tube along a second axis that is substantially parallel to the first axis, where the second end is configured to couple to a grain-receiving hopper. The extendable auger section also includes a first auger retained at least partially within the auger tough, and extending substantially along the first axis, and a second auger retained at least partially within the auger tube, and extending substantially along the second axis. The drive mechanism configured to move the auger tube and the second auger substantially along the second axis relative to the auger trough.

Another aspect of the present disclosure is directed to an extendable auger assembly. The extendable auger assembly includes an auger trough and an auger tube, where the auger trough has a first end, a second end, and a first auger. The auger tube has a first end, a second end, and a second auger, where the auger tube and the second auger are slidable relative to the auger trough such that the auger tube and the second auger are configured to move substantially parallel to the auger trough. The extendable auger assembly also includes a joint mechanism operably coupled to the first end of the auger trough, and a grain-receiving hopper operably coupled to the second end of the auger tube.

Another aspect of the present disclosure is directed to a method for transferring grain. The method includes positioning an extendable auger assembly adjacent to a grain delivery container, where the extendable auger assembly includes a first auger section, a second auger section, and a joint mechanism connected to the first auger section and the second auger section, and where the second auger section comprises an auger trough having a first auger, an auger tube having a second auger, and a grain-receiving hopper operably coupled to auger tube. The method also includes pivoting the second auger section relative to the first auger section, and moving the auger tube and the second auger in a first direction substantially parallel to the auger trough such that the grain-receiving hopper is disposed below the grain delivery container.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure is referred to by like reference numerals throughout the several views.

While the above-identified figures set forth alternative embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

The present disclosure is directed to an extendable auger assembly that is configured to transfer grain from a vehicle used to transport grain to a grain storage container, such as a grain silo. As discussed below, the extendable auger assembly of the present disclosure includes an extendable auger section having an upper auger tube and a lower auger trough, where the upper auger tube is configured to extend and retract relative to the lower auger trough to adjust the position of a grain-receiving hopper coupled to the upper auger tube. This arrangement allows the grain-receiving hopper to be repositioned (e.g., to multiple spaced-apart grain outlets) without requiring movement of the entire auger assembly or grain-transport vehicle.

Figure 1:
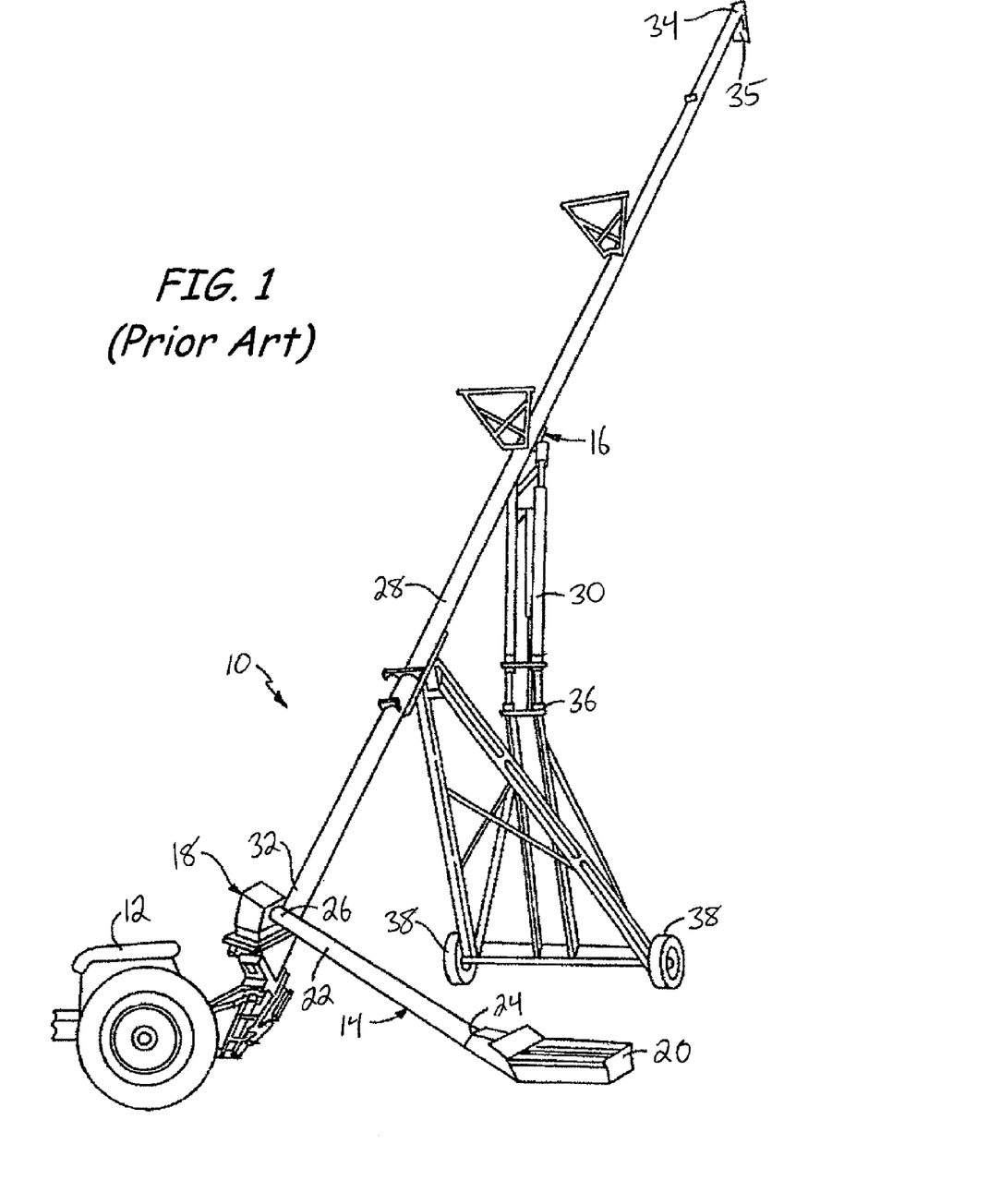
FIG. 1 is an isometric illustration of a conventional portable auger assembly.

Conventional auger assemblies typically have fixed ranges of movement, which restrict the positioning of grain-receiving hoppers. For example, as shown in FIG. 1, auger assembly 10 is a conventional, portable grain conveying system that may be coupled for movement to a tractor or other vehicle 12 by suitable connections. Auger assembly 10 includes a first shorter auger section 14, a second longer auger section 16, and hopper joint 18. A grain receiving hopper 20 is connected to shorter auger section 14 and is capable of receiving grain from a truck or trailer (not shown) used to transport grain. Second longer auger portion 16 of auger assembly 10 conveys grain into a storage container (not shown), such as a silo.

Shorter auger section 14 and longer auger section 16 are pivotally attached to each other via hopper joint 18, which is located therebetween. Because of the pivotal relationship between shorter auger section 14 and longer auger section 16, this type of portable grain conveying system is conventionally referred to as a "swing around hopper" grain conveying system. When in use, grain-receiving hopper 20 is pivoted to a position under a grain truck, trailer or wagon for unloading grain therefrom.

In addition to grain-receiving hopper 20, shorter auger section 14 includes a first hopper tube 22. First hopper tube 22 includes a first auger therein (not shown) for conveying the grain through first hopper tube 22. First hopper tube 22 also has a proximal end 24 and a distal end 26, where proximal end 24 is attached to grain-receiving hopper 20 and distal end 26 is attached to the hopper joint 18.

Longer auger section 16 includes second hopper tube 28 and ground engaging support structure 30 therefore. Similar to first hopper tube 22, second hopper tube 28 includes a second auger therein (not shown) for conveying the grain through second hopper tube 28. Second hopper tube 28 also includes a proximal end 32 and a distal end 34, where proximal end 32 is attached to hopper joint 18 and distal end 34 extends to an elevated position for delivering grain to a top opening of a silo via dispensing tip 35.

Support structure 30 includes height adjustment mechanism 36 and a plurality of wheels 38, which allows auger assembly 10 to be moved from location to location, and to be adjusted for use with silos having different heights. Operation of auger assembly 10 is preferably controlled by connecting the augers therein to a drive motor, such as on tractor 12. Operation of the augers of auger assembly 10 is accomplished by conventional drive means, such as by hydraulic engines using hydraulic lines or by direct attachment to a power take-off shaft extending from tractor 12.

In operation, auger assembly 10 is positioned so that distal end 34 of second hopper tube 28 (i.e., the outlet for hopper tube 28) is proximate to an upper inlet on a grain silo (not shown). A grain-bearing vehicle (not shown) is moved into position adjacent to auger assembly 10. Shorter auger section 14 is then pivoted using hopper joint 18 to align grain-receiving hopper 20 beneath one or more grain outlets on the grain-bearing vehicle. Those grain outlets are opened and the augers in auger assembly 10 are activated to convey grain from the grain-bearing vehicle to the silo.

Figure 2:
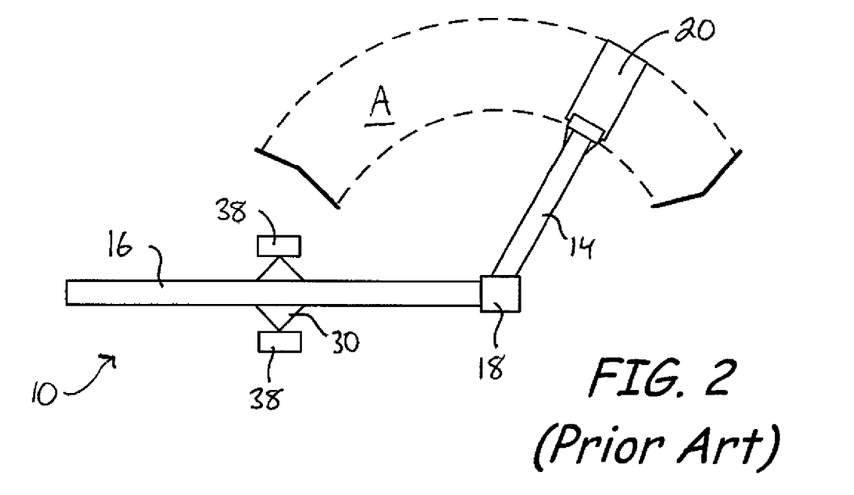
FIG. 2 is a schematic illustration of the extent of area that can be covered with the conventional auger assembly.

FIG. 2 illustrates an arcuate pathway A of shorter auger section 14 and grain-receiving hopper 20 that is attainable with auger assembly 10. In some instances, a grain-bearing truck, trailer or wagon will have multiple grain outlets spaced along its longitudinal length. If the vehicle is positioned perfectly, such as along arcuate pathway A, it may be possible to pivot shorter auger section 14 below multiple grain outlets without moving the vehicle to facilitate the unloading of grain from the vehicle. However, this requires precise positioning of the vehicle relative to the arcuate pathway A of shorter auger section 14.

Figure 3:
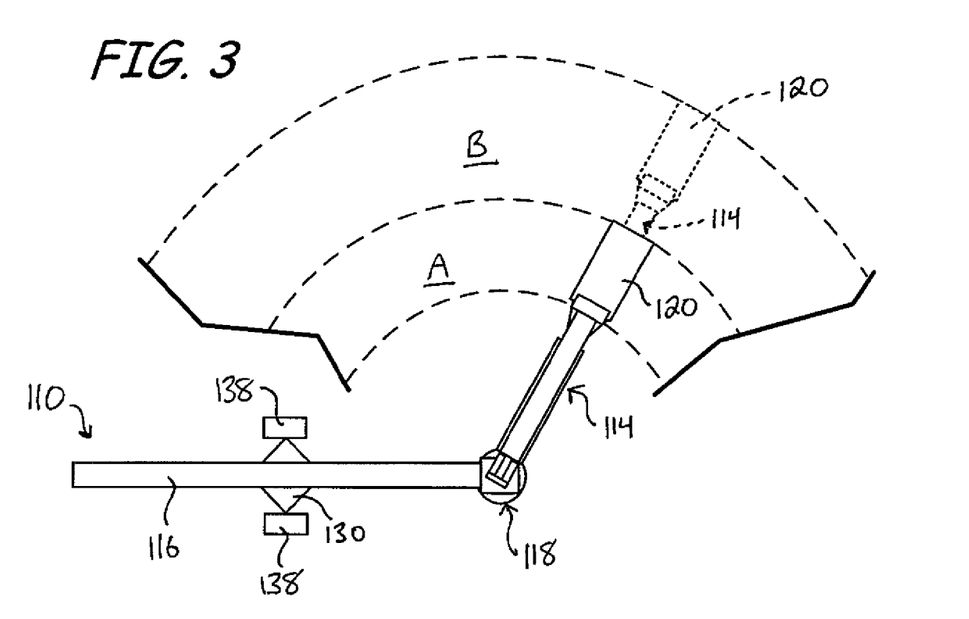
FIG. 3 is a schematic illustration of the extent of area that can be covered with an extendable auger assembly of the present disclosure.

FIGS. 3-15B illustrate extendable auger assembly 110 of the present disclosure, where respective reference numbers to those of auger assembly 10 (shown in FIGS. 1 and 2) are increased by "100". As shown in FIG. 3, extendable auger assembly 110 provides a more versatile arrangement to allow unloading grain from a vehicle while minimizing the necessity for additional movement of the vehicle, by virtue of changing the length of the shorter auger section to accommodate placing the grain-receiving hopper attached thereto under multiple spaced-apart outlets of such a stationary vehicle.

As shown, extendable auger assembly 110 includes auger section 114, auger section 116, and hopper joint 118. A grain-receiving hopper 120 is connected or otherwise coupled to auger section 114, and auger assembly 110 may operate generally in the manner discussed above with respect to auger assembly 10. Examples of suitable components and techniques of operation for auger section 116 and hopper joint 118 include those disclosed in Stewart et al., U.S. Pat. No. 5,788,055.

However, as shown in FIG. 3, the length of auger section 114 is adjustable between a retracted length (shown in solid in FIG. 3) and an extended length (shown in phantom in FIG. 3). When in its retracted state, the arc traversed by grain-receiving hopper 120 (and thus the area eligible for disposition below a grain outlet of a grain-bearing vehicle) is shown as area A, and may correspond to area A shown in FIG. 2.

When auger section 114 is in its extended position, that usable area is increased to include not only area A, but also area B. This larger area A+B thus illustrates the increased versatility of positioning of grain-receiving hopper 120 relative to multiple grain outlets of a grain-bearing vehicle. For instance, one outlet of the vehicle may be disposed above area A, while another outlet may be disposed above area B. Auger section 114 can be extended or retracted as necessary to place grain-collection hopper 120 thereon below a particular outlet of the vehicle, as desired. Without the extendable feature, grain-receiving hopper 120 would only be able to be disposed under an outlet that is over the area A (unless either the vehicle is moved or auger assembly 110 is moved).

Figure 4:
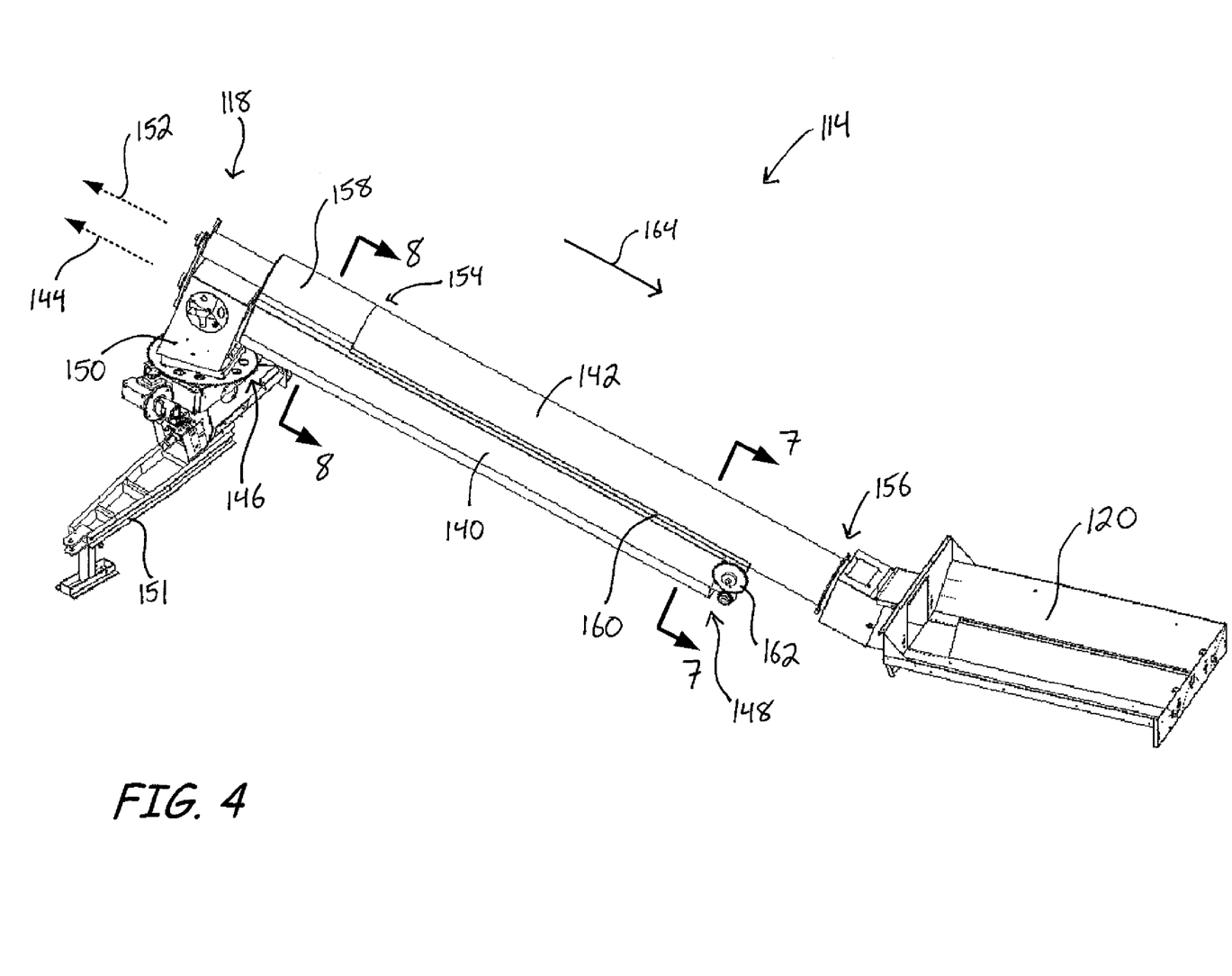
FIG. 4 is an isometric illustration of an auger section and a hopper joint of the auger assembly of the present disclosure, where the auger section is in a fully-retracted position.

FIGS. 4-14 illustrate examples of suitable embodiments for auger section 114, where auger section 116 is omitted for ease of discussion. As shown in FIG. 4, auger section 114 includes lower trough 140 and upper tube 142, each configured to retain a rotatable auger therein (not shown in FIG. 4) in a over-and-under manner, with substantially parallel axes, as discussed below.

Lower trough 140 is a U-shaped auger trough that extends along axis 144, and includes first end 146 coupled to hopper joint 118, and second end 148 offset along axis 144 from first end 146. In the shown embodiment, hopper joint 118 is a joint mechanism that includes gimbal box 150 retained by base structure 151, where gimbal box 150 provides a suitable location for coupling to lower trough 140. Upper tube 142 is an auger tube that extends along axis 152, and includes first end 154 and second end 156, where second end 156 is coupled to grain-receiving hopper 120. Axes 144 and 152 are substantially parallel to each other. The term "substantially" is used herein with respect to measurable values and ranges due to expected variations known to those skilled in the art (e.g., limitations and variabilities in measurements).

As discussed below, upper tube 142 retains an upper auger (not shown in FIG. 4) that drives grain from grain-receiving hopper 120 upward through upper tube 142. Upon reaching first end 154 of upper tube 142, the grain then falls down into lower trough 140. Lower trough 140 correspondingly includes a lower auger (not shown in FIG. 4) that drives the received grain upward through lower trough 140. Upon reaching first end 146 of lower trough 140, the grain then falls into hopper joint 118, and may be driven up auger section 116 (shown in FIG. 3).

Upper tube 142 is configured to move along axis 152 relative to lower trough 140 between a fully-retracted position (as shown in FIG. 4) and a fully-extended position (shown below in FIG. 6). This, in combination with the pivoting around hopper joint 118, allows grain-receiving hopper 120 to be positioned at any desired location in the A+B arcuate pathway (shown in FIG. 3).

As shown in FIG. 4, even when fully retracted, upper tube 142 and lower trough 146 are not fully coextensive. For example, second end 156 of upper tube 142 extends along axis 152 further past the extent of second end 148 of lower trough 140 along axis 144, in a direction toward grain-receiving hopper 120. Likewise, first end 154 of upper tube 142 does not extend along axis 152 as far as first end 146 of lower tube 140 along axis 144, in a direction toward hopper joint 118.

However, the upper auger inside upper tube 142 extends further along axis 152 toward hopper joint 118, past first end 154. As such, auger section 144 may also include a grain discharge head for upper tube 142, which may take the form of an upside down U-shaped cover 158. In this embodiment, cover 158 may be connected to first end 154 of upper tube 142 to cover the upper auger extending therefrom.

Grain carried by the upper auger within upper tube 142 exits upper tube 142 at first end 154, and then is carried by that upper auger and drops into lower trough 140. The upside down U-shaped cover 158 protects this area and covers the upper and lower augers at this grain transition area, where grain moves from upper tube 142 down into lower trough 140. Because cover 158 is connected to upper tube 142, cover 158 moves along axis 152 with upper tube 142 as upper tube 142 extends and retracts relative to the lower trough 140. The grain transition zone defined by cover 158 also moves relative to lower trough 140.

The mechanics of extension and retraction of upper tube 142 (and the upper auger therein) with respect to lower trough 140 (and the lower auger therein) may be accomplished in a variety of ways. In an exemplary embodiment, a rack and pinion configuration is illustrated for this purpose. A rack structure 160 may be secured relative to upper tube 142 for engagement with a rotatable pinion 162 that is mounted to lower trough 140. Rotation of pinion 162 then causes relative linear movement of rack structure 160, and thus movement of upper tube 142 along axis 152 relative to lower trough 140.

Figure 5:
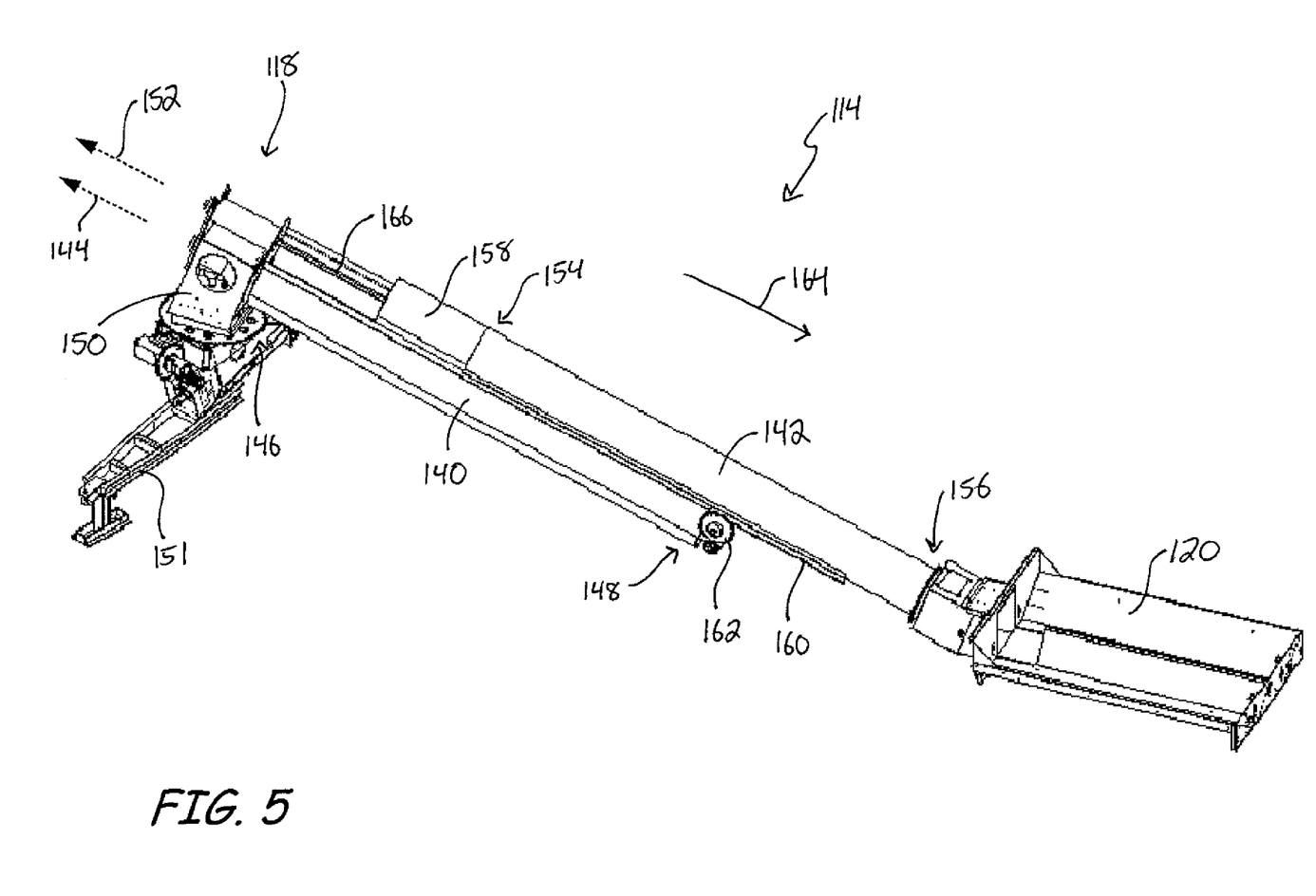
FIG. 5 is an isometric illustration of the auger section and the hopper joint of the extendable auger assembly, where the auger section is in a partially-extended position.

For example, pinion 162 may be rotated in a first rotational direction to move upper tube 142 along axis 152 in the direction of arrow 164 to extend upper tube 142 from its fully-retracted position. FIG. 5 illustrates auger section 144 with upper tube 142 in a partially-extended position. As shown, as upper tube 142, cover 158, and the upper auger (not shown in FIG. 5) move in the direction of arrow 164, the drive shaft of the upper auger (referred to as drive shaft 166) becomes exposed beyond cover 158.

Figure 6:
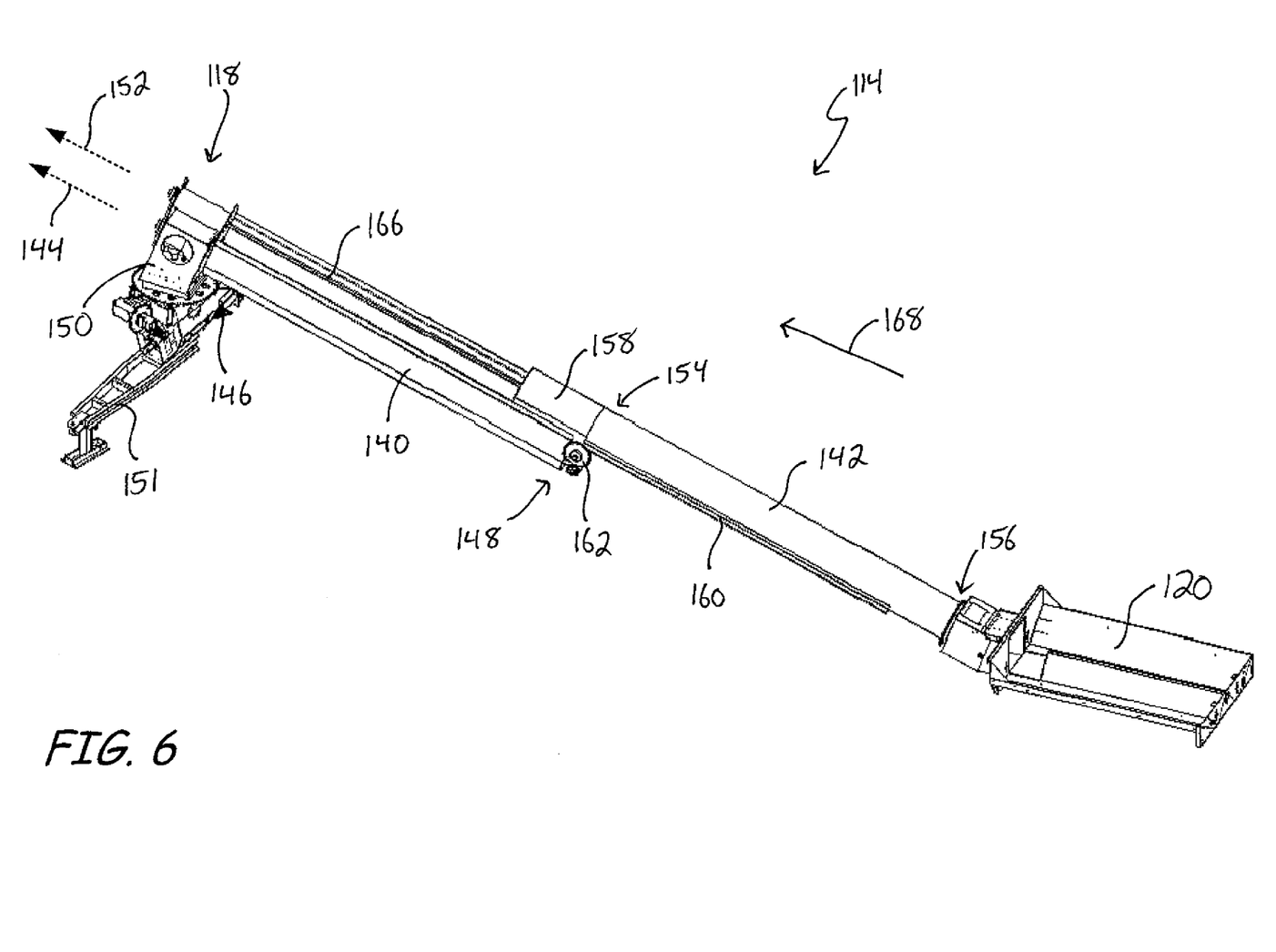
FIG. 6 is an isometric illustration of the auger section and the hopper joint of the extendable auger assembly, where the auger section is in a fully-extended position.

FIG. 6 illustrates auger section 144 with upper tube 142 in a fully-extended position, which shows drive shaft 166 in a further exposed state. As shown, in this fully-extended position, first end 154 of upper tube 142 is positioned adjacent to pinion 162 and second end 148 of lower trough 140. However, cover 158 remains extending over a portion of lower trough 140, thereby directing the grain passing though upper tube 142 to fall into lower trough 140.

To retract upper tube 142, pinion 162 may be rotated in a second rotational direction that is opposite of the first rotational direction. This moves upper tube 142 along axis 152 in the direction of arrow 168 (opposite of arrow 154, shown in FIGS. 4 and 5). Accordingly, upper tube 142 may be extended and retracted relative to lower trough 140 to adjust the axial position of grain-receiving hopper 120. Furthermore, auger section 114 may be pivoted with hopper joint 118 to adjust the radial position of grain-receiving hopper 120. As can be appreciated, these movements of upper tube 142 may be performed in any suitable combination to position and reposition grain-receiving hopper 120 at any desired location within the A+B area (shown in FIG. 3).

Pinion 162 may be rotated by any suitable means, such as manual or motor driven, whether by electric motor or hydraulic motor or the like. Controls for manipulation of this extension and retraction function may be disposed on a remote control device using radio frequency control signals or disposed on a control panel or device associated with the hopper joint 118 or some other convenient location on the auger assembly 110.

Figure 7:
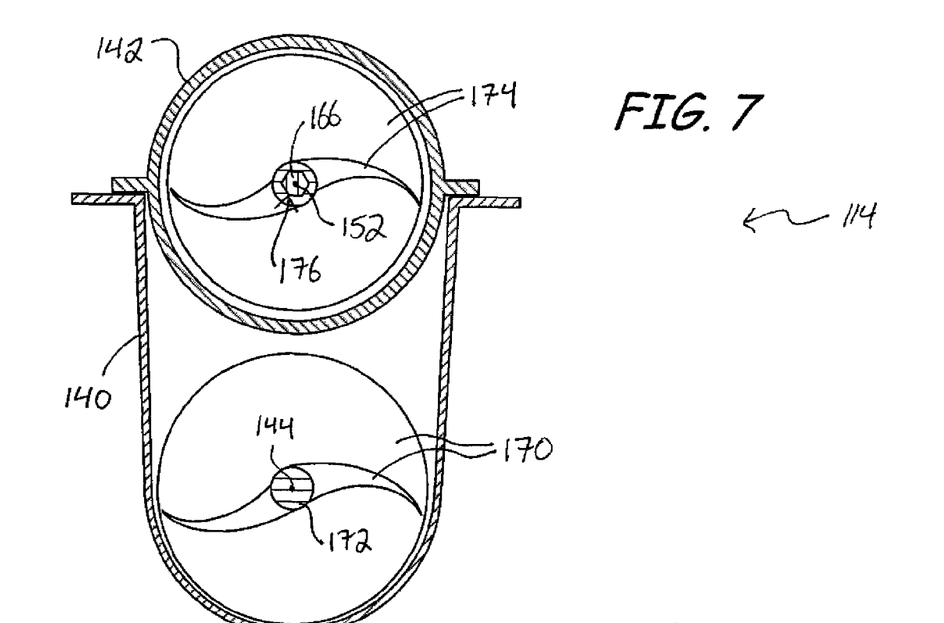
FIG. 7 is a sectional view taken along section lines 7-7 in FIG. 4.

FIG. 7 is a sectional view of Section 7-7 taken in FIG. 4, which illustrates the relative relationship between lower trough 140 and upper tube 142. As shown in FIG. 7, lower trough 140 retains lower auger 170 having drive shaft 172, each of which extend substantially along and rotate around axis 144. Correspondingly, upper tube 142 retains upper auger 174 having drive shaft 166, each of which extend substantially along and rotate around axis 152.

As mentioned above, lower auger 170 and upper auger 174 are mounted in a over-and-under manner, with substantially parallel axes. Lower auger 170 and upper auger 174 are also desirably both arranged with their respective flightings, so that when in operation, any grain contacted by lower auger 170 and upper auger 174 is moved through the auger section 114 away from grain-receiving hopper 120 and toward hopper joint 118.

In the shown embodiment, drive shaft 166 for upper auger 174 has a hex-shaped cross section, and upper auger 174 includes central bore 176 with a reciprocating cross section that mates with drive shaft 166. This arrangement allows the rotation of drive shaft 166 to transfer rotational energy to upper auger 174 while drive shaft 166 is rotated, while also allowing upper auger 174 to slide along drive shaft 166 (i.e., substantially along axis 152) to extend and retract. While illustrated with a hex-shaped engagement, auger section 114 may alternatively use any suitable drive shaft arrangement that allows the telescoping of upper auger 174 relative to drive shaft 166, while also maintaining the coupled rotation between drive shaft 166 and upper auger 174 (e.g., a square-shaped engagement).

Figure 8:
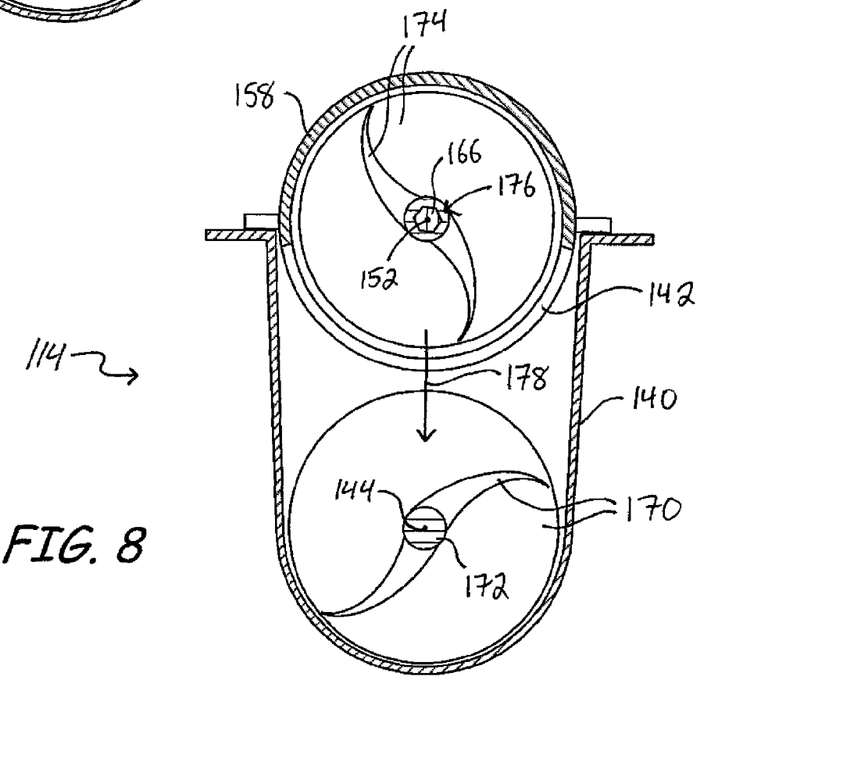
FIG. 8 is a sectional view taken along section lines 8-8 in FIG. 4.

FIG. 8 is a sectional view of Section 8-8 taken in FIG. 4, which illustrates the grain transition zone for dispensing the grain from upper tube 142 down into lower trough 140. At the grain transition zone, cover 158 extends over lower trough 140. Grain carried by upper auger 174 within upper tube 142 exits upper tube 142 at first end 154, and then is carried by upper auger 174 and drops into lower trough 140. Cover 158 accordingly protects this area and covers upper auger 174 and lower auger 170 at this grain transition area, allowing the grain to fall from upper tube 142 down into lower trough 140, as illustrated by arrow 178.

Figure 9:
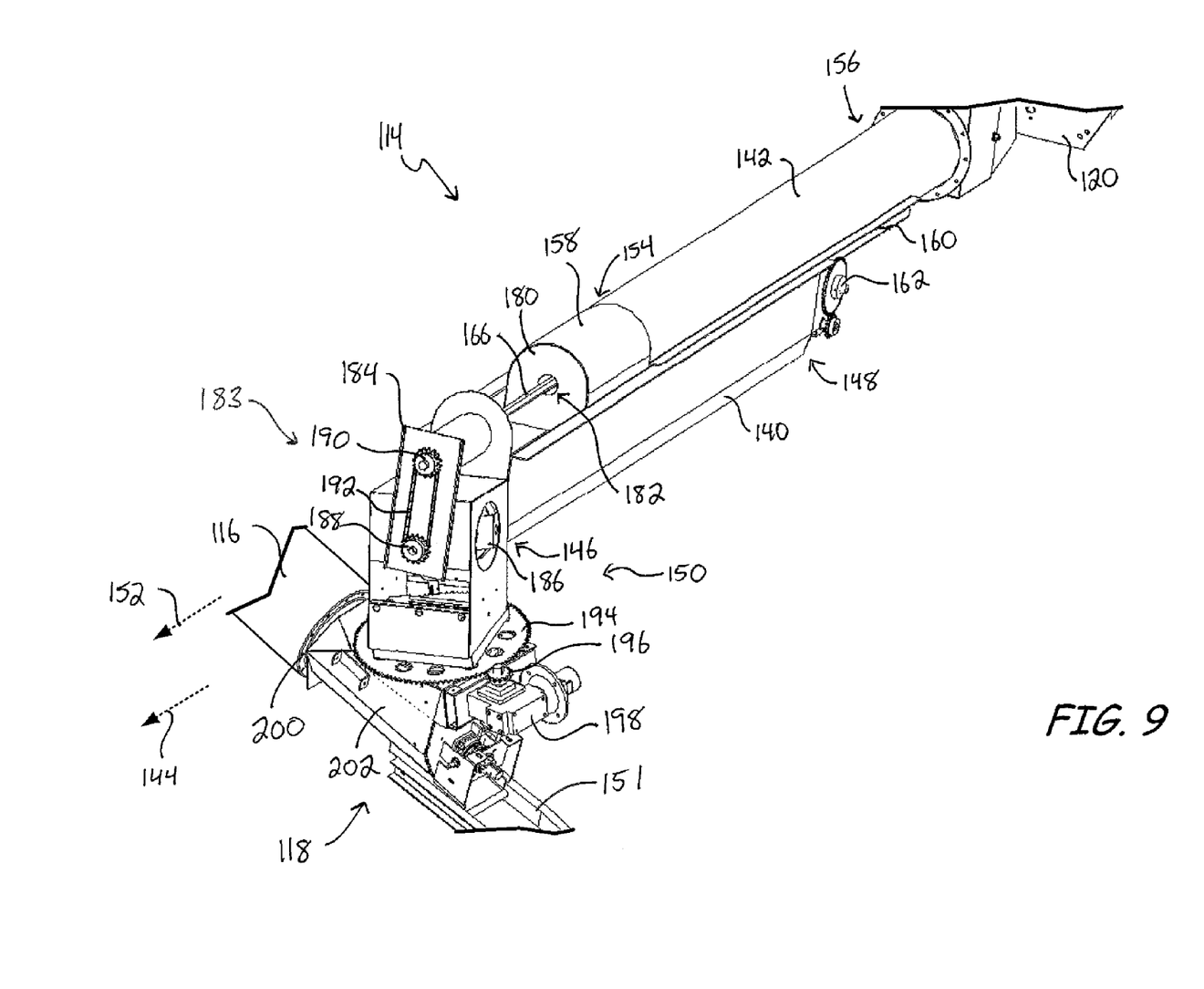
FIG. 9 is an isometric illustration of a portion of the extendable auger assembly, as viewed from a hopper joint of the extendable auger assembly.

As best shown in FIG. 9, cover 158 includes end panel 180 which closes off a lateral end of cover 158. End panel 180 includes opening 182 that permits drive shaft 166 to extend therethrough for access to upper auger 174 within upper tube 142 and cover 158.

In one embodiment, as illustrated in FIG. 9, drive shaft 166 extends from gimbal box 150, where gimbal box 150 includes a rotational-power transfer mechanism 183. In the shown example, rotational-power transfer mechanism 183 includes support plate 184, drive motor 186, pulleys or sprockets 188 and 190, and belt or chain 192. Support plate 184 is secured to gimbal box 150 and retains sprockets 188 and 190 at offset locations such that sprockets 188 and 190 are capable of rotating substantially around axes 144 and 152, respectively. Sprocket 188 is operably engaged with a first end of drive motor 186, where drive motor 186 is supported by gimbal box 150, and where drive shaft 182 of lower auger 170 is engaged with a second end of drive motor 186. This arrangement allows drive motor 186 to simultaneously rotate drive shaft 182 and sprocket 188 in the same rotational direction.

Sprocket 190 is operably coupled to drive shaft 166 of upper auger 174, and is engaged with sprocket 188 via chain 192. This arrangement allows the rotation of sprocket 188 (via drive motor 186) to also rotate sprocket 190, and hence, rotate drive shaft 166. As such, drive motor 186 may rotate drive shaft 166 and upper auger 174 substantially around axis 152 at substantially the same rotational rate and direction as the rotation of drive shaft 172 and lower auger 170 around axis 144.

In alternative embodiments, lower auger 170 and upper auger 174 may be operated using a variety of different drive mechanisms. As noted above with respect to the extension and retraction function, lower auger 170 and upper auger 174 may be operated by one or more drive motors coupled to the drive shafts 166 and 172, which can include hydraulic engines or direct attachment to a power takeoff shaft extending from the tractor 12, or by an independent motor (e.g., drive motor 186). Activation of drive shafts 166 and 172 for upper auger 174 and lower auger 170 may be controlled by a remote control, via a control panel on hopper joint 118, or via some control device associated with auger assembly 110.

In FIG. 9, some portions of hopper joint 118 have been removed for clarity of illustration. For instance, hopper joint 118 may also include one or more cover portions over support plate 184, drive motor 186, sprockets 188 and 190, and/or chain 192, and other operable mechanical components.

Pivoting of auger section 114 relative to auger section 116 (shown in FIG. 3) may be accomplished by manual mechanisms or by suitable drive motor mechanisms (such as the exemplary ones noted above). In the illustrative embodiment, inter-engaging gears are provided to rotate gimbal box 150 relative to base structure 151. Such gears may include a large sun gear 194 and a smaller connecting gear 196. Connecting gear 196 is in turn connected to motor 198 which is activated to cause the rotation of gimbal box 150 relative to base structure 151. Again, such rotation may be achieved by manual mechanisms or by other motive mechanisms, such as a hydraulic motor or from tractor power takeoff. Also, operation of the rotation of gimbal box 150 may be achieved by remote control or from an operator panel located along auger assembly 110.

Auger section 116 is coupled to base structure 151 at coupling 200. In use, grain enters grain collecting hopper 120, is directed into upper tube 142 and carried by upper auger 174 therein to first end 154 and under cover 158. The grain then falls (since cover 158 has no bottom) down into lower trough 140 where it is then carried by lower auger 170 therein to and into gimbal box 150. Grain falls through gimbal box 150, through an opening in the center of sun gear 196 and into lower housing portion 202 on base structure 151. Grain is then diverted into auger section 116 and ultimately out its upper or distal end (not shown in FIG. 9) and into an awaiting silo or other grain receiving structure.

Figure 10:
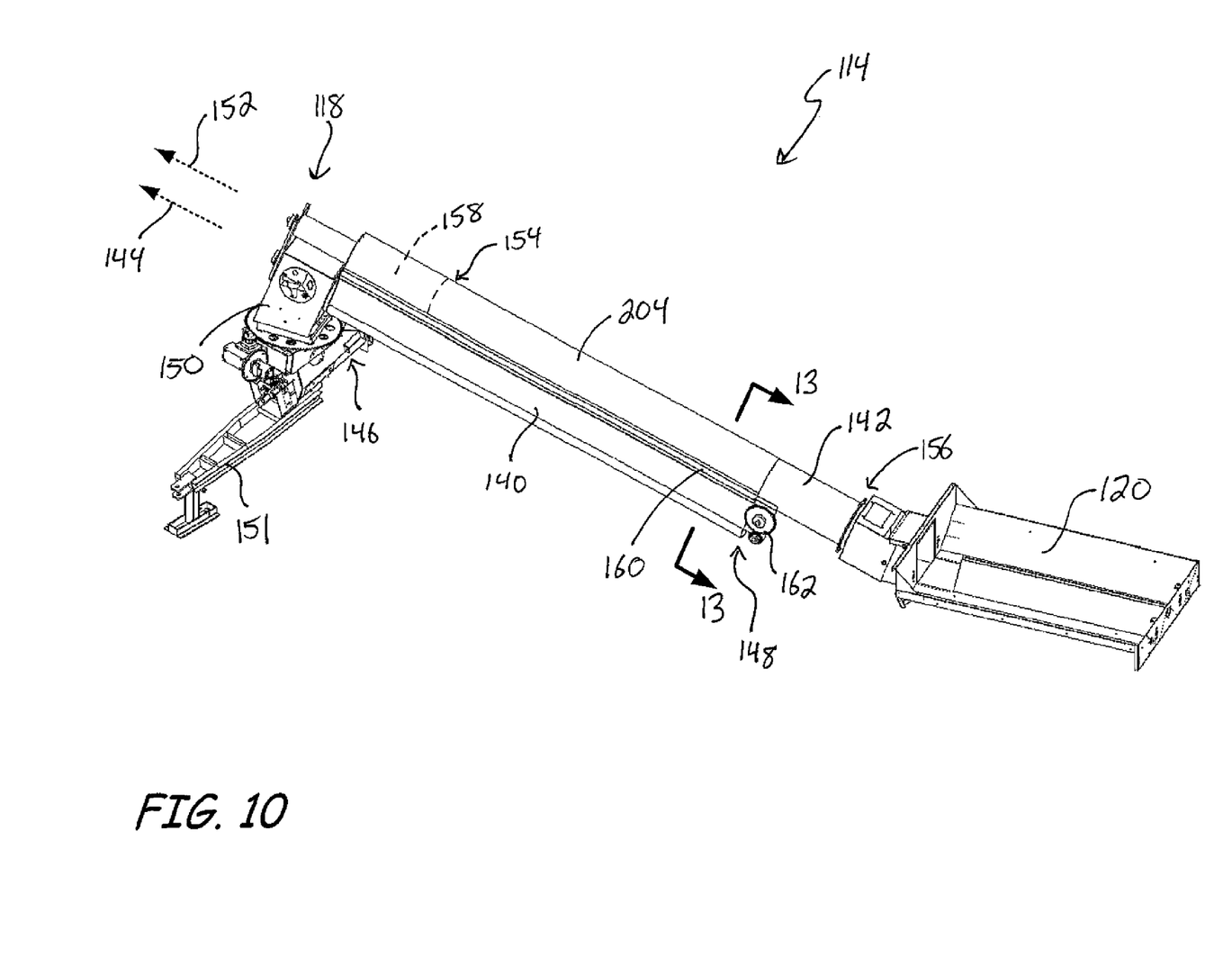
FIG. 10 is an isometric illustration of an auger section and a hopper joint of the auger assembly of the present disclosure, where the auger section includes a cover and is in a fully-retracted position.

As is apparent from FIGS. 5, 6, and 9, when upper tube 142 is extended relative to lower trough 140, a portion of drive shaft 166 is exposed. As shown in FIG. 10, in one configuration, the auger assembly 110 may also include an additional upper cover 204 which is disposed over upper tube 142 and cover 158. Upper cover 204 is fixed in position above lower trough 140 and may also be in the form of an upside down U-shape.

Figure 11:
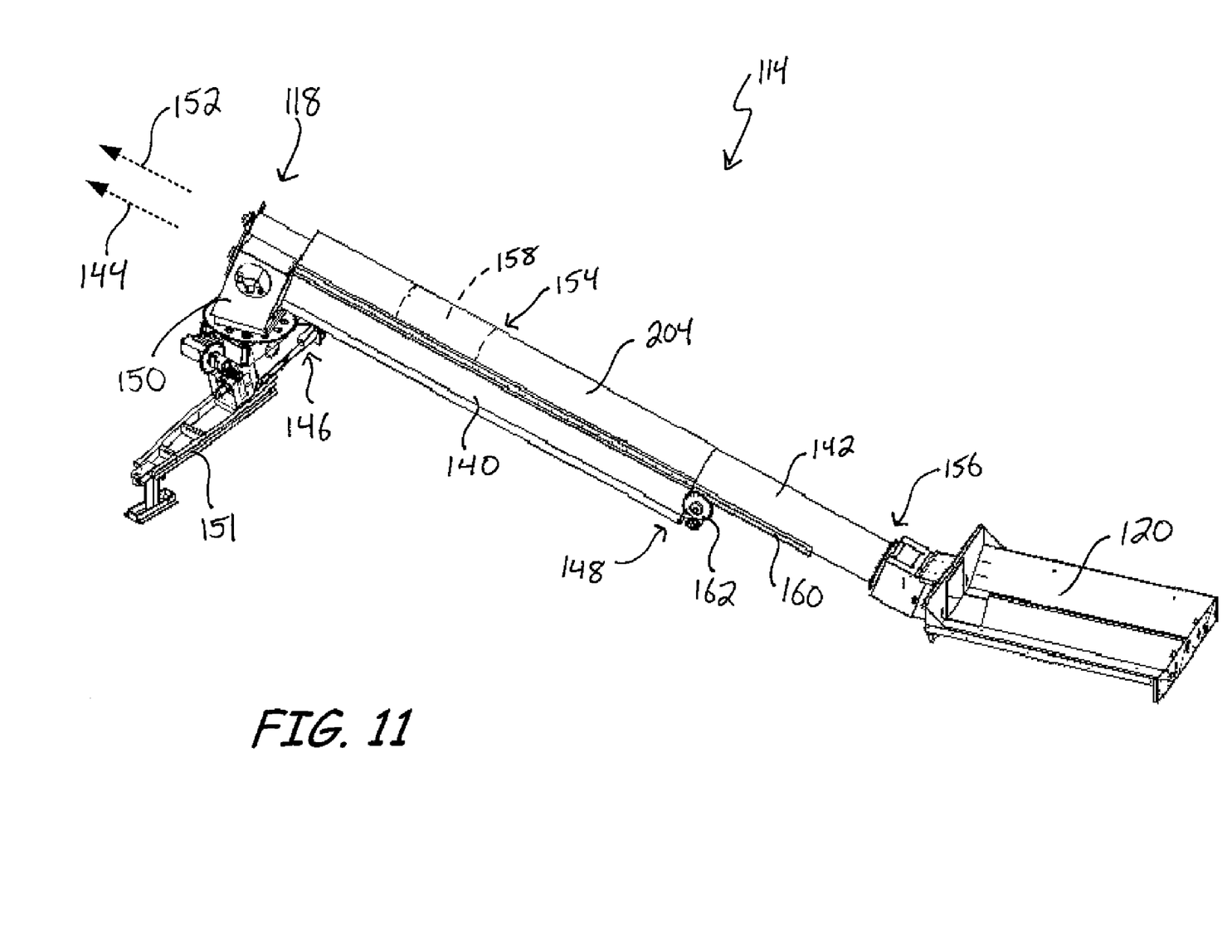
FIG. 11 is an isometric illustration of the auger section and the hopper joint of the extendable auger assembly, where the auger section includes the cover and is in a partially-extended position.
Figure 12:
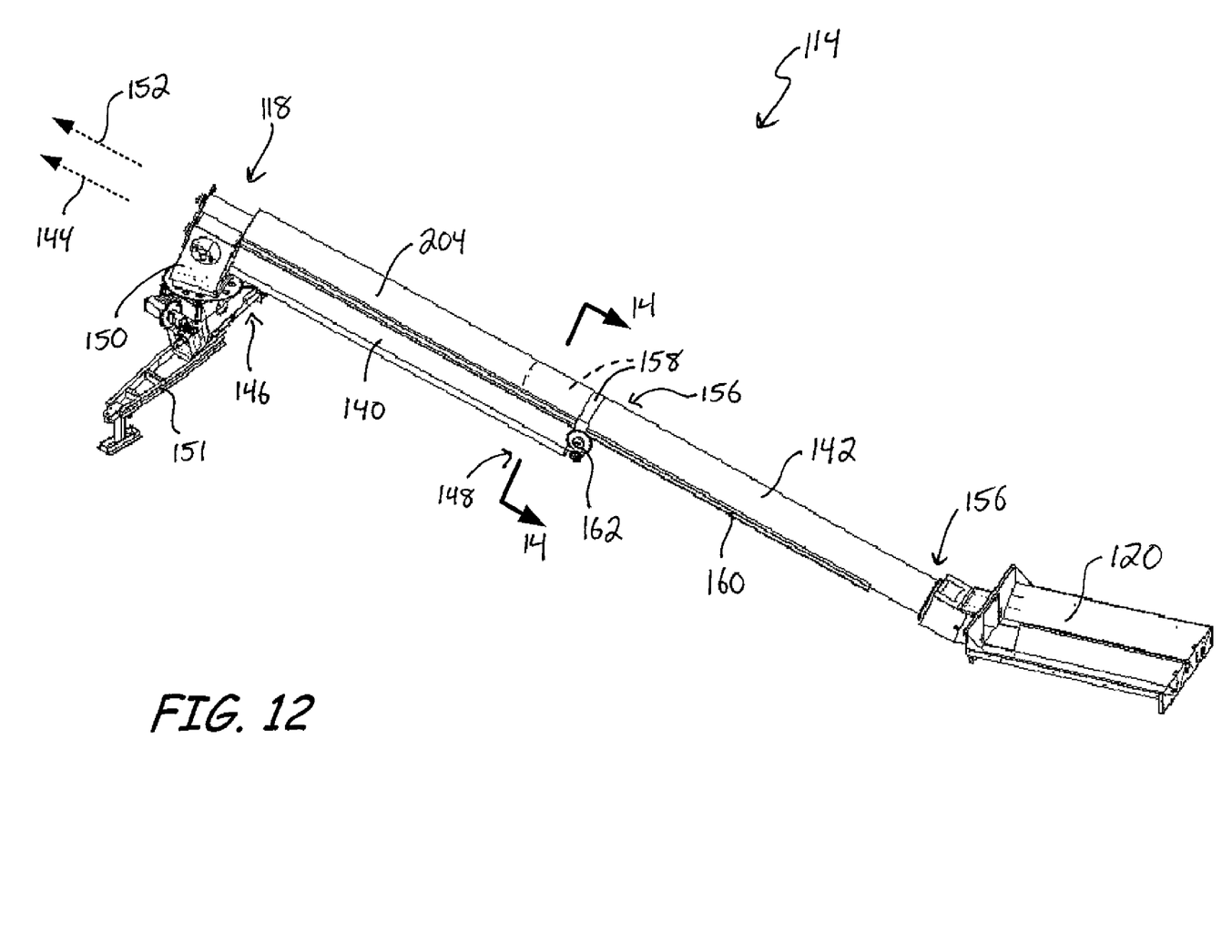
FIG. 12 is an isometric illustration of the auger section and the hopper joint of the extendable auger assembly, where the auger section includes the cover and is in a fully-extended position.

As shown in FIGS. 11 and 12, when upper tube 142 and cover 158 are extended in the direction of arrow 164, upper cover 204 maintains a cover over lower trough 140, drive shaft 166, and lower auger 170, which otherwise become exposed when upper tube 142 and cover 158 are extended away from gimbal box 150.

Figure 13:
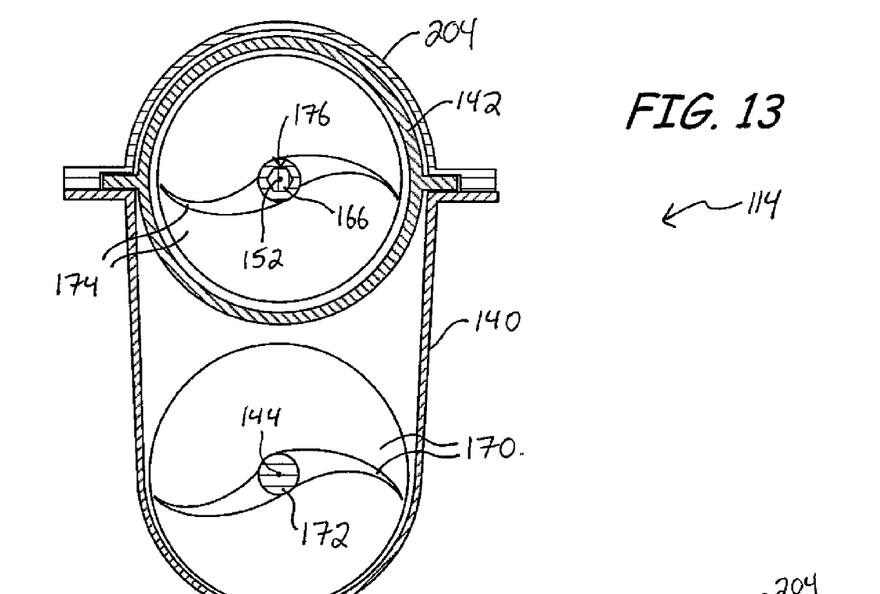
FIG. 13 is a sectional view taken along section lines 13-13 in FIG. 10.
Figure 14:
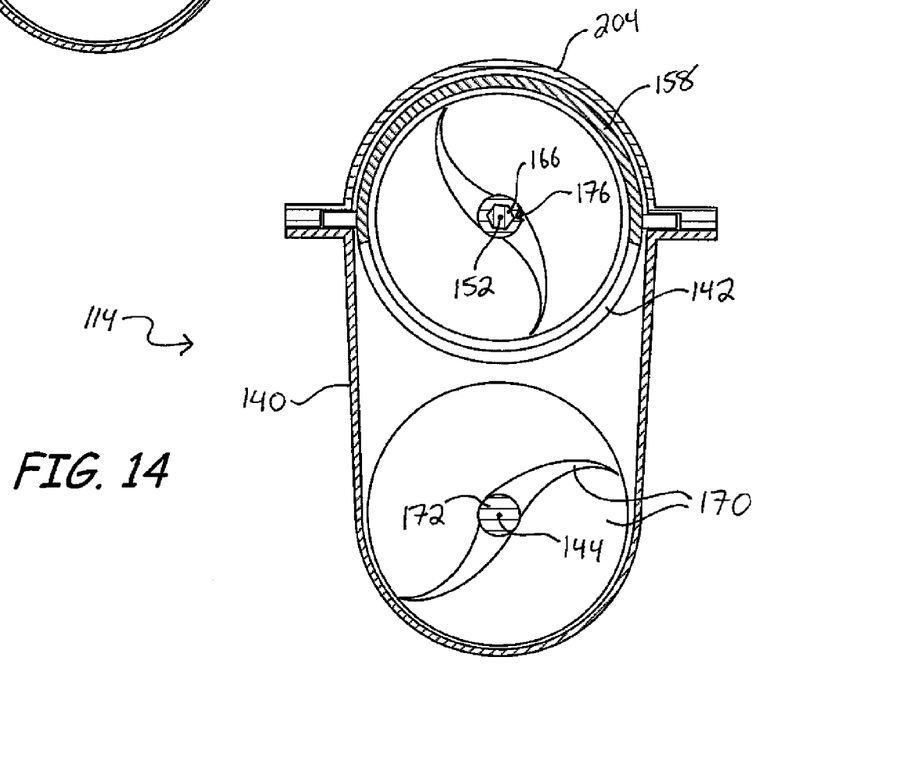
FIG. 14 is a sectional view taken along section lines 14-14 in FIG. 12.

FIG. 13 is a sectional view of Section 13-13 taken in FIG. 10, which illustrates the relative relationship between lower trough 140, upper tube 142, and upper cover 204 when upper tube 142 is fully retracted. Correspondingly, FIG. 14 is a sectional view of Section 14-14 taken in FIG. 12, which illustrates the relative relationship between lower trough 140, upper tube 142, and upper cover 204 when upper tube 142 is fully extended.

Figure 15A:
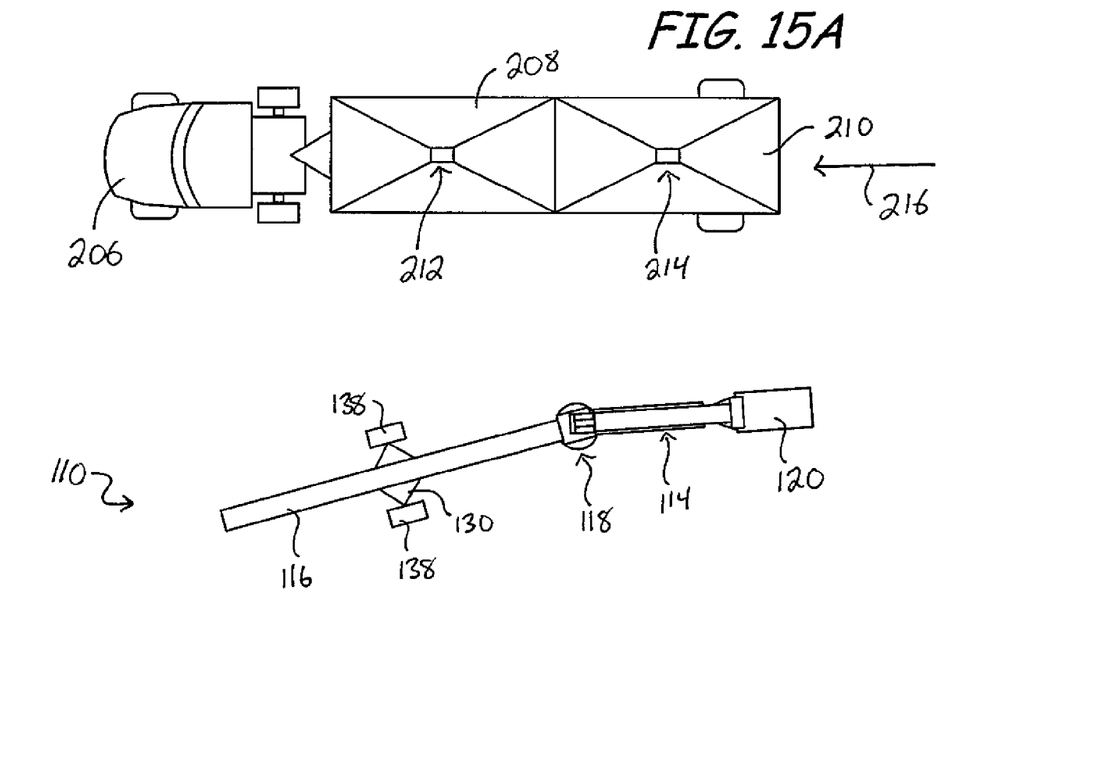
FIGS. 15A-15D schematically illustrate an exemplary grain transfer operation employing a grain-bearing truck-trailer and the extendable auger assembly.

FIGS. 15A-15D illustrate the use of auger assembly 110 in connection with a vehicle 206. As shown in FIG. 15A, vehicle 206 has a pair of hoppers 208 and 210 having grain outlets 212 and 214, respectively. In a typical operation, vehicle 190 may approach auger assembly 110 (as indicated by approach arrow 216), and then park.

Figure 15B:
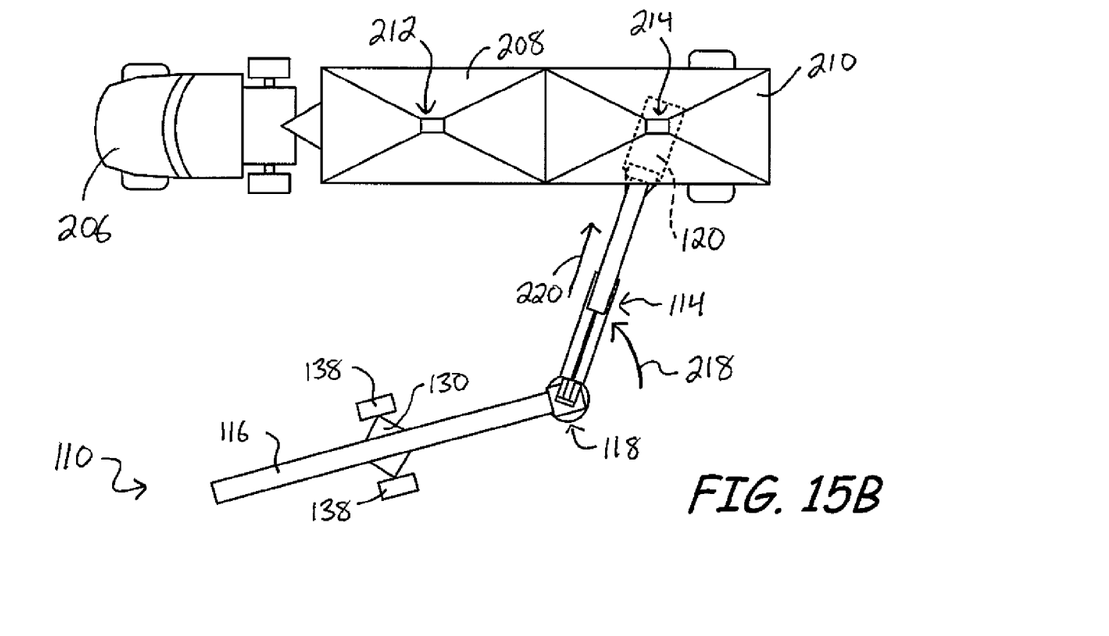

As shown in FIG. 15B, once vehicle 206 is stationary, the auger section 114 may be pivoted around hopper joint 118 to a position that aligns auger section 114 with one of the grain outlets (e.g., grain outlet 214), as indicated by arrow 218. The operable length of the auger section 114 may then be extended to align grain-receiving hopper 120 with grain outlet 214 of grain hopper 210, as indicate by arrow 220. As discussed above, this involves extending upper tube 142 substantially along axis 152 relative to lower trough 140. Grain outlet 214 may then be opened so that grain can fall into grain-receiving hopper 120. The received grain is then moved through auger sections 114 and 116, as discussed above, for dispensing into a suitable grain container or silo (not shown).

Figure 15C:
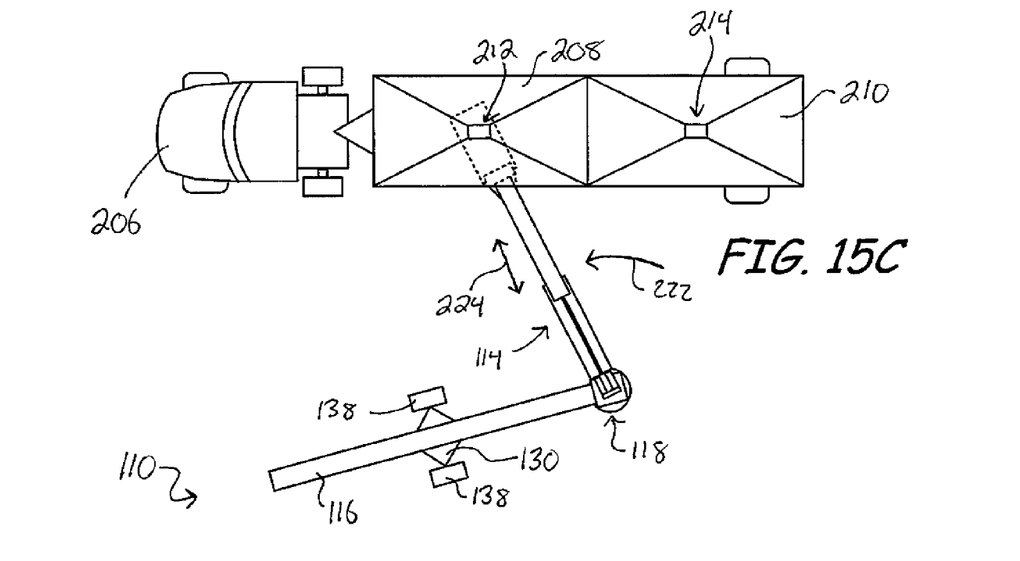

As shown in FIG. 15C, once the grain hopper 210 of vehicle 206 above grain-receiving hopper 120 is emptied of grain, grain outlet 214 may be closed and auger section 114 may be pivoted around hopper joint 118 into alignment with another grain outlet (e.g., grain outlet 212) of another hopper on vehicle 206 (e.g., hopper 208), as illustrated by arrow 222. If necessary, auger section 114 may also be extended or retracted to position grain-receiving hopper 120 under grain opening 212, as indicated by arrow 224.

Once grain-receiving hopper 120 is positioned under grain opening 212 of hopper 208, grain opening 212 may then be opened to allow grain to drain from hopper 208 it into grain-receiving hopper 120. The received grain is then moved through auger sections 114 and 116, as discussed above, for dispensing into a suitable grain container or silo (not shown).

Figure 15D:
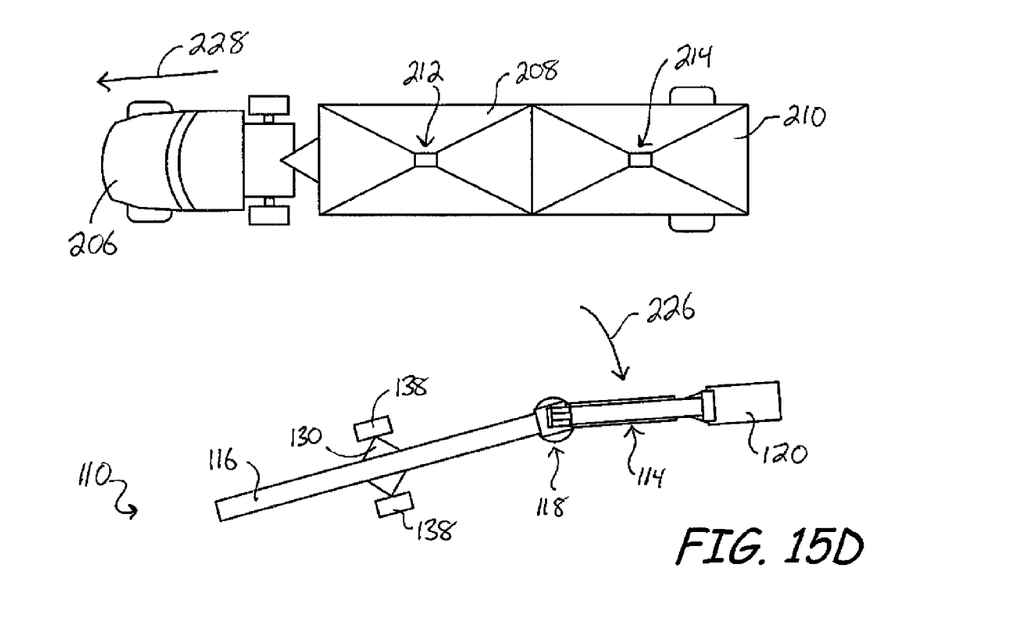

As shown in FIG. 15D, once grain hopper 208 is empty, grain opening 212 can be closed. Auger section 114 may then be partially or fully retracted and pivoted out from under vehicle 206, as illustrated by arrow 226. The now empty vehicle can then be moved away from auger assembly 110, such as illustrated by arrow 228, and replaced with another vehicle that is full of grain to be emptied via auger assembly 110. This process can then be repeated as necessary, without having to move auger assembly 110, other than pivoting and extension retraction of auger section 114 relative to auger section 116.

Although the present disclosure has been described with reference to preferred embodiments, workers skilled in the art will recognize that changes may be made in form and detail without departing from the spirit and scope of the disclosure.

The invention claimed is:

1. An extendable auger section for use with an auger assembly, the extendable auger section comprising:
    an auger trough comprising a first end configured to couple to a joint mechanism of the auger assembly, and a second end offset from the first end of the auger trough along a first axis;
    an auger tube comprising a first end and a second end offset from the first end of the auger tube along a second axis that is substantially parallel to the first axis, the second end being configured to couple to a grain-receiving hopper;
    a first auger retained at least partially within the auger tough, and extending substantially along the first axis;
    a second auger retained at least partially within the auger tube, and extending substantially along the second axis; and
    a drive mechanism configured to move the auger tube and the second auger substantially along the second axis relative to the auger trough.

2. The extendable auger section of claim 1, and further comprising a drive shaft, wherein the second auger comprises an axial bore configured to receive the drive shaft such that the second auger is slidable relative to the drive shaft substantially along the second axis and such that the drive shaft is rotatably engaged to the second auger.

3. The extendable auger section of claim 1, wherein the first auger and the second auger are configured to rotate in the same rotational direction and at substantially the same rotational rates.

4. The extendable auger section of claim 1, wherein the drive mechanism comprises a rack and pinion mechanism.

5. The extendable auger section of claim 1, and further comprising a grain discharge head coupled to the first end of the auger tube.

6. The extendable auger section of claim 1, and further comprising an outer cover operably coupled to the auger trough, wherein the auger tube is configured to move along the second axis at least partially between the outer cover and the auger trough.

7. The extendable auger section of claim 1, wherein the first end of the auger trough is not coextensive with the first end of the auger tube while the auger tube is in a fully-retracted position.

8. An extendable auger assembly comprising:
    an auger trough having a first end, a second end, and a first auger;
    an auger tube having a first end, a second end, and a second auger, wherein the auger tube and the second auger are slidable relative to the auger trough such that the auger tube and the second auger are configured to move substantially parallel to the auger trough;
    a joint mechanism operably coupled to the first end of the auger trough; and
    a grain-receiving hopper operably coupled to the second end of the auger tube.

9. The extendable auger assembly of claim 8, and further comprising a second auger tube having a first end operably coupled to the joint mechanism and a second end coupled to a dispensing tip, wherein the joint mechanism is configured to pivot the auger trough and the auger tube relative to the second auger tube.

10. The extendable auger assembly of claim 8, and further comprising a drive shaft configured to slidably engage with the second auger such that second auger is slidable relative to the drive shaft substantially along the second axis and such that the drive shaft is rotatably engaged to the second auger.

11. The extendable auger assembly of claim 8, and further comprising
    a first drive shaft coupled to the first auger;
    a second drive shaft configured to engage the second auger; and
    a rotational-power transfer mechanism supported by the joint mechanism, the rotational-power transfer mechanism being engaged with the first drive shaft and the second drive shaft to rotate the first drive shaft and the second drive shaft in the same rotational direction and at substantially the same rotational rates.

12. The extendable auger assembly of claim 8, and further comprising a grain discharge head coupled to the first end of the auger tube, wherein the grain discharge head is slidable with the auger tube relative to the auger trough.

13. The extendable auger assembly of claim 8, and further comprising an outer cover operably coupled to the auger trough, wherein at least a portion of the auger tube is configured to extend between the outer cover and the auger trough.

14. The extendable auger assembly of claim 8, wherein the first end of the auger trough is not coextensive with the first end of the auger tube while the auger tube is in a fully-retracted position.

15. A method for transferring grain, the method comprising:
positioning an extendable auger assembly adjacent to a grain delivery container, the extendable auger assembly comprising a first auger section, a second auger section, and a joint mechanism connected to the first auger section and the second auger section, wherein the second auger section comprises an auger trough having a first auger, an auger tube having a second auger, and a grain-receiving hopper operably coupled to auger tube;
pivoting the second auger section relative to the first auger section; and
moving the auger tube and the second auger in a first direction substantially parallel to the auger trough such that the grain-receiving hopper is disposed below the grain delivery container.

16. The method of claim 15, and further comprising:
receiving the grain from the grain delivery container to the grain-receiving hopper;
driving the grain through the auger tube with the second auger;
depositing the grain from the auger tube into the auger trough; and
driving the grain through the auger trough with the first auger.

17. The method of claim 15, and further comprising moving the auger tube and the second auger in a second direction substantially parallel to the auger trough, wherein the second direction is opposite of the first direction.

18. The method of claim 15, wherein moving the auger tube and the second auger in a first direction substantially parallel to the auger trough comprises extending the auger tube relative to the auger trough.

19. The method of claim 15, wherein moving the second auger in the first direction substantially parallel to the auger trough comprises sliding the second auger in the first direction relative to a drive shaft for the second auger.

20. The method of claim 19, and further comprising rotating the drive shaft to rotate the second auger.

* * * * *